Patented Nov. 9, 1943

2,333,769

UNITED STATES PATENT OFFICE 2,333,769

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application September 8, 1941, Serial No. 410,086

10 Claims. (Cl. 252—341)

This invention relates primarily to the resolution of petroleum emulsions.

One object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object is to provide an economical and rapid process for separating emulsions which have been prepared under controlled conditions from mineral oil, such as crude petroleum and relatively soft waters or weak brines. Controlled emulsification and subsequent demulsification under the conditions just mentioned is of significant value in removing impurities, particularly inorganic salts, from pipeline oil.

The new chemical compound or composition of matter used as the demulsifier of our herein described process for breaking petroleum emulsions, is exemplified by the acidic, or preferably, neutral ester derived by complete esterification of one mole of a polyalkylene glycol of the kind hereinafter described, with two moles of a fractional ester derived from a hydroxylated material of the kind herein described, and a polybasic carboxy acid having not over six carbon atoms.

If a hydroxylated material, indicated, for the sake of convenience, by the formula T.OH, is reacted with a polybasic carboxy acid, which, similarly, may conveniently be of the dibasic type and indicated by the formula HOOC.D.COOH, then the fractional ester obtained by reaction between equimolar quantities may be indicated by the following formula:

HOOC.D.COO.T

The polyethylene glycol may be characterized by materials of the kind such as heptaethylene glycol, octaethylene glycol, nonaethylene glycol, decaethylene glycol, to and including heptadecaethylene glycol. For convenience, these polyethylene glycols may be indicated by the following formula:

OH(C₂H₄O)ₘH 

in which m varies from 7 through 17.

Instead of polyethylene glycols, one may use polypropylene glycols or polybutylene glycols. Thus, for convenience, in the broadest aspect, the polyalkylene glycols employed may be indicated by the following formula:

OH(CₙH₂ₙO)ₘH 

in which m has its previous significance, and n represents a numeral varying from 2 to 4.

Thus, the bulk of the materials herein contemplated for use as demulsifiers, may be indicated within certain variations, as hereinafter stated, by the neutral ester derived by esterification of one mole of a glycol of the kind above described, with two moles of a fractional ester of the kind previously described. The formation of the compound may be indicated by the following reaction, although obviously, it is immaterial what particular procedure is employed to produce the particular chemical compound or product:

T.OOC.D.COOH + OH(C₂H₄O)ₘH + HOOC.D.COO.T
T.OOC.D.COO(C₂H₄O)ₘ₋₁C₂H₄.OOC.D.COO.T 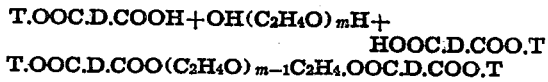

As indicated previously, the polybasic acids employed are limited to the type having not more than six carbon atoms, for example, oxalic, malonic, succinic, glutaric, and adipic. Similarly, one may employ acids such as fumaric, maleic, glutaconic, and various others, including citric, malic, tartaric, and the like. The selection of the particular tribasic or dibasic acid employed is usually concerned, largely, with convenience of manufacture of the finished ester, and also of the price of the reactants. Generally speaking, the higher the temperature employed, the easier it is to obtain large yields of the esterified product. Although oxalic acid is comparatively cheap, it decomposes somewhat readily at slightly above the boiling point of water. For this reason, it is more desirable to use an acid which is more resistant to pyrolysis. Similarly, when a polybasic acid is available in the form of an anhydride, such anhydride is apt to produce the ester with greater ease than the acid itself. For this reason, maleic anhydride is particularly adaptable; also, everything else considered, the cost is comparatively low on a per molar basis, even though somewhat higher on a per pound basis. Succinic acid or the anhydride has many of the attractive qualities of maleic anhydride; and this is also true of adipic acid. For purposes of brevity, the bulk of the compounds hereinafter disclosed will refer to the use of maleic anhydride, although it is understood that any other suitable polybasic acid may be employed. Furthermore, for purposes of convenience, reference is made to the use of polyethylene glycols. As has been previously indicated, such glycols can be replaced by suitable polypropylene or polybutylene compounds.

As far as the range of oxyalkylated compounds 

employed as reactants is concerned it is our preference to employ those having approximately 8–12 oxyalkylene groups, particularly 8–12 oxyethylene groups. Our preference to use the oxyethylated compounds is due, largely, to the fact that they are commercially available, and particularly so in two desirable forms. The most desirable form is the so-called nonaethylene glycol, which, although consisting largely of nonaethylene glycol, may contain small amounts of heptaethylene and octaethylene glycols, and possibly minor percentages of the higher homologs. Such glycols represent the upper range of distillable glycols; and they may be conveniently referred to as "upper distillable ethylene glycols." There is no particularly good procedure for making a sharper separation on a commercial scale; and it is understood that mixtures of one or more of the glycols may be employed, as well as a single glycol. As pointed out, it is particularly preferred to employ nonaethylene glycol as commercially available, although it is understood that this product contains other homologs, as indicated.

Substantially as desirable as the upper distillable polyethylene glycols, are the lower non-distillable polyethylene glycols. These materials are available in the form of a waxy water-soluble material, and the general range may vary somewhat from deca- to tetradecaethylene glycol. As is well understood, the method of producing such glycols would cause some higher homologs to be formed; and thus, even in this instance, there may be present some oxyethylene glycols within the higher range above indicated. One need not point out that these particular compounds consist of mixtures, and that in some instances, particularly desirable esters are obtained by making mixtures of the liquid nonaethylene glycol with the soft, waxy, lower non-distillable polyethylene glycols. For the sake of convenience, reference in the examples will be to nonaethylene glycol; and calculations will be based on a theoretical molecular weight of 414. Actually, in manufacture, the molecular weight of the glycol employed, whether a higher distillable polyethylene glycol or a lower non-distillable polyethylene glycol, or a mixture of the same, should be determined and reaction conducted on the basis of such determination, particularly in conjunction with the hydroxyl or acetyl value.

It has been previously pointed out that it is immaterial how the compounds herein contemplated are manufactured, although we have found it most desirable to react the selected glycol or mixtures of glycols with maleic anhydride in a ratio of two moles of the anhydride for one mole of the glycol. Under such circumstances, we have found little tendency to form longer chain polymers; and in fact, the product of reaction, if conducted at reasonably low temperatures, appears to be largely monomeric. For convenience, such intermediate fractional ester may then be considered as a dibasic or polybasic acid. One mole of the intermediate fractional ester, so obtained, is then reacted with two moles of the alcoholic material of the kind subsequently described.

It is to be noted, however, that if one prepares a fractional acidic ester, then if two moles of the fractional acidic ester are reacted with one mole of the polyethylene glycol, there is no possibility for the formation of polymeric types of esterification products under ordinary conditions.

The alcoholic bodies employed as reactants in one mode of manufacture of the present compounds are basic hydroxylated polyacylated polyamino amides containing:

(a) Two acyl radicals derived from a monocarboxy acid, preferably non-hydroxy in nature, having not more than 5 carbon atoms and linked to the two terminal nitrogen atoms;

(b) An acyl radical derived from a detergent-forming monocarboxy acid having at least 8 and not more than 32 carbon atoms; and (c) An alcoholiform hydroxyl radical.

The preferred form of alcoholic body is characterized by not only the three above enumerated characteristics, but also the additional characteristic of having present a basic amino hydrogen group, i. e., an amino hydrogen radical free from directly linked acyl radicals or aryl radicals. Furthermore, this preferred type of alcoholic body, as well as the modification having no hydroxyl groups, is effective as a demulsifier per se under the same conditions and when used in the same manner as the demulsifier herein contemplated. As far as we are aware, such type of material, subsequently described in greater detail, is a new composition of matter per se.

Attention is directed to our two co-pending applications for patent Serial Nos. 401,378 and 401,381, both filed July 7, 1941.

As examples of reactants employed in the manufacture of the alcoholic bodies herein contemplated, particularly as intermediates, there are included among others, diethylenetriamine, triethylenetetramine, tetraethylenepentamine, and comparable derivatives derived from propylene dichloride, butyl dichloride, amylene dichloride, and the like. Indeed, instead of using propylene dichloride as a reactant for producing a satisfactory polyamine for use as a raw material, one can employ the comparable amine derived from glycerol dichlorhydrin, i. e., beta-hydroxy propylene dichloride.

The detergent-forming acids include those acids which combine with alkalies to produce soap or soap-like bodies. The detergent-forming acids, in turn, include naturally-occurring fatty acids, resin acids, such as abietic acid, naturally-occurring petroleum acids, such as naphthenic acids, carboxy acids produced by the oxidation of petroleum, etc.

As to oxidized petroleum acids, see U. S. Patent No. 2,242,837, dated May 20, 1941, to Shields.

As is well known, there are other acids having similar characteristics and derived from a somewhat different source and different in structure, but which can be included within the broad generic term previously indicated. Such acids have at least 8 carbon atoms and not more than 32 carbon atoms, and the most desirable form is exemplified by the fatty acids, particularly the unsaturated fatty acids, more especially by ricinoleic acid.

The low molal acids having 5 carbon atoms or less, are exemplified by acetic acid, formic acid, propionic acid, butyric acid, furoic acid, lactic acid, hydroxybutyric acid, etc.; however, the non-hydroxylated type are most desirable, i. e., the type other than lactic acid, hydroxybutyric acid, etc. A number of suitable amines have already been suggested.

Reference is made to U. S. Patent No. 2,243,329, dated May 27, 1941, to De Groote and Blair. This patent lists a large number of polyamines containing three or more basic amino groups. It also includes description of procedure generally employed for acylation by means of a high molal or low molal acid. It is understood, of course, that one need not employ the acid itself, but the acid radical may be introduced by employing an ester, anhydride, amide, acyl chloride, or any other suitable form.

Reference to the aforementioned U. S. Patent No. 2,243,329 is for the purpose of including all suitable reactants therein mentioned with the same force and effect as if they were repeated in the present instance.

The following examples will serve to illustrate the manufacture of such acylated polyamino compounds. It is to be noted that in many instances it is most convenient to first introduce an acyl radical of a low molal carboxy acid of the kind described, and then introduce the acyl radical from a high molal carboxy acid of the kind described. The introduction of the high molal acyl radical may be in an amido form or in an ester form. In some instances this may require the treatment of the first acylation product with ethylene oxide or the like. All of this is obvious to the skilled chemist, in view of what has been said; but the following examples will illustrate the matter even further:

INTERMEDIATE ACYLATION PRODUCT

Example 1

One pound mole of diethylene triamine is treated with 2 pound moles of methyl acetate so as to give a diacetylated product of the type characterized by the fact that the two acetyl radicals are attached to the terminal nitrogen atoms, the reason being that the primary amino radical acylates more readily than the secondary amino radical.

INTERMEDIATE ACYLATION PRODUCT

Example 2

One pound mole of the product of the kind described under Example 1, preceding, is treated with one pound mole of ethylene oxide, so as to give the hydroxyethyl derivative.

INTERMEDIATE ACYLATION PRODUCT

Example 3

The same procedure is followed as in Example 2, except that 2 pound moles of ethylene oxide are used, thus introducing a hydroxylated radical containing an ether linkage. In other words, the secondary amino hydrogen atom is replaced by the group $C_2H_4OC_2H_4OH$.

INTERMEDIATE ACYLATION PRODUCT

Example 4

Triethylene tetramine is substituted for diethylenetriamine in the Intermediate acylation product, Examples 1, 2 and 3, preceding. It is to be noted in this instance, however, that the use of two moles of ethylene oxide produces two hydroxyethyl groups in the oxyethylated product; and in order to introduce the group $C_2H_4OC_2H_4OH$, one must employ at least 3 moles of ethylene oxide.

INTERMEDIATE ACYLATION PRODUCT

Example 5

The same procedure is followed as in Example 4, except that tetraethylenepentamine is substituted for triethylenetetramine. In this instance, in order to obtain a hydroxylated radical containing the ether linkage, at least 4 moles of ethylene oxide must be employed.

INTERMEDIATE ACYLATION PRODUCT

Example 6

Products comparable to Examples 1–5, preceding, are obtained from polyamines, which, in turn, instead of being derivatives of ethylene dichloride, are derivatives of propylene dichloride.

INTERMEDIATE ACYLATION PRODUCT

Example 7

Polyamines derived from glycerol dichlorhydrin (betahydroxypropylene dichloride):

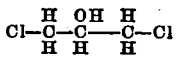

are substituted for the amines employed in the preceding example, i. e., amines derived from propylene dichloride.

COMPLETELY ACYLATED PRODUCTS

Example 1

One pound of the products of the kind described in Intermediate acylation products, Examples 1–7, inclusive, are treated with one pound mole of oleic acid, so as to produce a polyamino amide of the kind previously described.

COMPLETELY ACYLATED PRODUCTS

Example 2

Ricinoleic acid is substituted for oleic acid in the previous example.

COMPLETELY ACYLATED PRODUCTS

Example 3

Naphthenic acid is substituted for oleic acid in the previous example.

COMPLETELY ACYLATED PRODUCTS

Example 4

Abietic acid is substituted for oleic acid in the previous examples.

COMPLETELY ACYLATED PRODUCTS

Example 5

Oxidized petroleum acids of the kind described in aforementioned Shields Patent No. 2,242,837, having approximately 12-16 carbon atoms and being of the branch chain type, are substituted for oleic acid in the previous example.

COMPLETELY ACYLATED PRODUCTS

Example 6

In some instances, where derived from tetraamine or penta-amino compounds, it is possible to introduce more than one high molal acyl group. For instance, one might introduce two ricinoleyl radicals, or one ricinoleyl radical and one oleyl radical.

It has been previously pointed out that the alcoholic bodies herein contemplated for reaction with nonaethylene glycol dihydrogen dimaleate or the equivalent dibasic fractional ester, represent, in part, a sub-genus of a broader class, and that this broader classification per se represents valuable demulsifying agents without further reaction.

The alcoholic bodies herein employed as reactants need not have a basic amino nitrogen atom and obviously, do not have when derived from a reactant such as diethylenetriamine in certain instances. For example, if one pound mole of diethylenetriamine is reacted with 2 pound moles of acetic acid or its equivalent, one obtains the diacetylated product. If such product is then acylated, for example, with ricinoleic acid, the resultant product is hydroxylated, but is not basic in character, insofar that there is not present an amino nitrogen atom free from linkage with an aryl radical or acyl radical. It is well known that linkage of an amino nitrogen atom with an acyl radical, or with an aryl radical, enormously reduces or substantially eliminates basicity.

If, however, such diacetylated diethylenetriamine is treated with one mole of ethylene oxide, and if such product is then treated with ricinoleic acid, the acyl radical, or more specifically, the ricinoleyl radical, enters as part of an ester linkage and not an amido linkage. Such product exemplifies a type which is an alcoholic body, and is also basic in character, i. e., a valuable demulsifier as is, without further reaction. Furthermore, if the same oxyethylated product is treated with oleic acid, the resultant compound is also a valuable demulsifier, but is of no value for manufacturing the final composition of matter herein contemplated, for the reason that there is no residual hydroxyl radical to permit combination with nonaethylene glycol dihydrogen dimaleate, or the like.

From a practical standpoint, the manufacture of the reagents which are valuable demulsifying agents, although not alcoholic bodies, has already been suggested. This is obvious by referring back to Intermediate acylation products, Examples 4 and 5, wherein there are directions for treating triethylenetetramine and tetraethylenepentamine with 2 moles of acetic acid, methyl acetate, or the like, so as to convert the primary amino groups into the diacetylated derivatives. Since there still remain 2 or 3 basic amino nitrogen atoms, one can acylate with a high molal acid, such as oleic acid, ricinoleic acid, or the like, in fact, might introduce two such acids in the instance where the derivative is obtained from tetraethylenepentamine. If derived from a hydroxylated acid, such as ricinoleic acid, then the intermediate would serve as an alcoholic body; but if derived from oleic acid, abietic acid, naphthenic acid, or the like, this would not be true. However, such product would serve as a demulsifier without further reaction with nonaethylene glycol, or the like. Similarly, regardless of whether the high molal acyl group introduced contained a hydroxyl radical or not, i. e., even in such instances where the product is derived from oleic acid, naphthenic acid, or the like, the reaction product can be treated further with ethylene oxide, propylene oxide, or the like, so as to introduce a hydroxyethyl or an $OHC_2H_4OC_2H_4$ radical, and thus permit subsequent reaction with nonaethylene glycol dihydrogen dimaleate, if desired. However, this type of material, i. e., where there is present 2 terminal acyl radicals derived from a low molal carboxy acid, and where there is present at least 2 basic amino nitrogen atoms, and at least one high molal acyl radical, one has an effective demulsifier. If hydroxylated, it may serve as an alcoholic body for reaction with nonaethylene glycol dihydrogen dimaleate; and alcoholic bodies of a similar type containing no basic amino group, will also serve as reactants for combination with nonaethylene glycol dihydrogen dimaleate or the like.

As specific examples of the types of compounds which may be used as the demulsifier in our process, without reaction with nonaethylene glycol dihydrogen dimaleate, attention is directed to the following:

*Structural formula A*

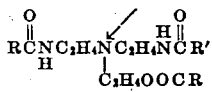

*Structural formula B*

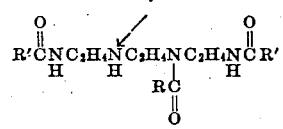

*Structural formula C*

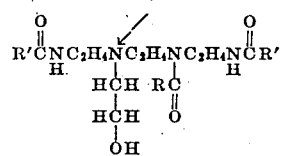

*Structural formula D*

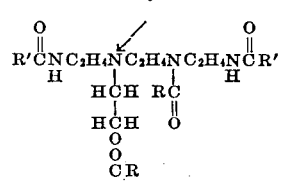

R'CO represents acyl radicals of low molal carboxy acids, and RCO, radical of high molal carboxy acids, which may or may not be hydroxylated, i. e., may represent oleic acid or ricinoleic acid.

In each instance the arrow points to the basic amino group.

Comparable products may be derived from tetraethylene-pentamine in which the same basic type of radical appears, or a combination of basic types. It is to be noted that the efficient method of producing the compounds herein contemplated is by first treating the selected primary raw material with acetic acid or the like, so as to introduce the terminal acetyl radicals, the reason being that such reactions are readily controllable so as to enter the terminal position, since the terminal amino groupings are primary amino groups and acylate more rapidly and more completely than the internal amino groups which are secondary amino radicals. In compounds of the kind just described, it is to be emphasized once more that all these represent valuable demulsifiers as is, and as far as we are aware, new compositions of matter per se. Where hydroxylated, whether it be due to the presence of a hydroxyethyl group, a ricinoleyl group, or the like, such compounds may serve for reaction as an alcoholic body with nonaethylene glycol dihydrogen dimaleate or the like to give the other composition of matter herein contemplated. Furthermore, we are aware that valuable derivatives can be obtained by reaction with other polybasic materials, such as phthalic anhydride, and particularly for use as demulsifiers for water-in-oil emulsions of the kind herein referred to.

Having obtained hydroxylated acylated amido compounds of the kind previously described, the next step, of course, is to obtain fractional esters derived from nonaethylene glycol of the kind described in the earlier part of the present disclosure. Such materials may be illustrated by the following:

GLYCOL ESTER INTERMEDIATE PRODUCT

Example 1

One pound mole of nonaethylene glycol is reacted with two pound moles of maleic anhydride, so as to form nonaethylene glycol dihydrogen dimaleate.

GLYCOL ESTER INTERMEDIATE PRODUCT

Example 2

A mixture of lower non-distillable polyethylene glycols, representing approximately deca- to tetradecaethylene glycol, is substituted for nonaethylene glycol in the preceding example.

GLYCOL ESTER INTERMEDIATE PRODUCT

Example 3

A 50-50 mixture of nonaethylene glycol and lower nondistillable polyethylene glycols of the kind described in the previous example is substituted for nonaethylene glycol in Example 1.

GLYCOL ESTER INTERMEDIATE PRODUCT

Example 4

Adipic acid is substituted for maleic anhydride in Examples 1-3, preceding.

GLYCOL ESTER INTERMEDIATE PRODUCT

Example 5

Oxalic acid is substituted for maleic anhydride in Example 1-3 preceding.

GLYCOL ESTER INTERMEDIATE PRODUCT

Example 6

Citric acid is substituted for maleic anhydride in Examples 1-3, preceding.

GLYCOL ESTER INTERMEDIATE PRODUCT

Example 7

Succinic anhydride is substituted for maleic anhydride in Examples 1-3, preceding.

The method of producing such fractional esters is well known. The general procedure is to employ a temperature above the boiling point of water and below the pyrolytic point of the reactants. The products are mixed and stirred constantly during the heating and esterification step. If desired, an inert gas, such as dried nitrogen, or dried carbon dioxide, may be passed through the mixture. Sometimes it is desirable to add an esterification catalyst, such as sulfuric acid, benzene sulfonic acid, or the like. This is the same general procedure as employed in the manufacture of ethylene glycol dihydrogen diphthalate. See U. S. Patent No. 2,075,107, dated March 30, 1937, to Frasier.

Sometimes esterification is conducted most readily in the presence of an inert solvent, that carries away the water of esterification which may be formed, although, as is readily appreciated, such water of esterification is absent when the reaction involves an acid anhydride, such as maleic anhydride, and a glycol. However, if water is formed, for instance, when citric acid is employed, then a solvent such as xylene may be present and employed to carry off the water formed. The mixture of xylene vapors and water vapors can be condensed so that the water is separated. The xylene is then returned to the reaction vessel for further circulation. This is a conventional and well known procedure and requires no further elaboration.

COMPOSITION OF MATTER

Example 1

Two pound moles of a hydroxylated material of the kind exemplified by "Completely acylated products, Example 1" are reacted with one pound mole of a glycol ester intermediate product of the kind described under Glycol ester intermediate products, Examples 1, 2 and 3, preceding. Such reaction is conducted until substantially all carboxyl acidity has disappeared. The time of reaction may vary from a few hours to as many as 20 hours.

COMPOSITION OF MATTER

Example 2

The same procedure is followed as in Composition of matter, Example 1, except that one employs a hydroxylated intermediate product described under Completely acylated products, Example 2, preceding, instead of in Example 1.

COMPOSITION OF MATTER

Example 3

The same procedure is followed as in Composition of matter, Example 1, except that one employs a hydroxylated intermediate product described under Completely acylated products, Example 3, preceding, instead of in Example 1.

COMPOSITION OF MATTER

Example 4

The same procedure is followed as in Composition of matter, Example 1, except that one employs a hydroxylated intermediate product described under Completely acylated products, Example 4, preceding, instead of in Example 1.

COMPOSITION OF MATTER

Example 5

The same procedure is followed as in Composition of matter, Example 1, except that one employs a hydroxylated intermediate product described under Completely acylated products, Example 5, preceding, instead of in Example 1

COMPOSITION OF MATTER

Example 6

The same procedure is followed as in Composition of matter, Example 1, except that one employs a hydroxylated intermediate product described under Completely acylated products, Example 6, preceding, instead of in Example 1

COMPOSITION OF MATTER

Example 7

The same procedure is followed as in Composition of matter, Example 1, except that one employs a hydroxylated material of the kind exemplified by structural formulas A, B, C or D, preceding, instead of Completely acylated products, Example 1, which was employed in Composition of matter, Example 1.

COMPOSITION OF MATTER

Example 8

The same procedure is followed as in Composition of matter, Examples 1 to 7, preceding, except that instead of using glycol ester intermediate products of the kind exemplified by Glycol ester intermediate products, Examples 1, 2 and 3, preceding, there are exemplified products of the kind described in Glycol ester intermediate products, Examples 4 to 7, preceding.

In such previous examples, which include the use of ricinoleic acid, attention is directed to the fact that excellent products of unusual value are obtainable by substituting oxyalkylated ricinoleic acid, particularly oxyethylated ricinoleic acid, in place of ricinoleic acid. The preparation of such material is well known and preferably involves the following procedure:

Triricinolein in the form of castor oil is treated with 3–12 moles of ethylene oxide for each mole of triricinolein. One-half of 1% of sodium stearate or sodium ricinoleate is used as a catalyst. A temperature of 100–200° C. is employed. The reaction is conducted varying from 100 lbs. to 300 lbs. gauge pressure. The water-insoluble oxyethylated triricinolein so obtained is saponified so as to yield a water-insoluble oxyethylated ricinoleic acid, or one which at the most is self-emulsifying.

Reviewing what has been said, it is obvious that a wide range in carbon atom content exists in regard to the alcoholic bodies employed for reaction with the glycol dihydrogen diacid ester. For instance, such alcoholic body might contain two ethylene radicals, two acetyl radicals, and one ricinoleyl radical, totaling 26 carbon atoms. On the other hand, derivatives from a pentamine containing 3 ricinoleyl radicals, for example, might readily contain approximately 60 or 70 carbon atoms, or even in excess of 70 carbon atoms, provided that instead of acetic acid, one used a low molal monocarboxy acid having a larger number of carbon atoms.

It is to be noted that this second step is an esterification reaction, and the same procedure is employed as suggested above in the preparation of the intermediate product. Needless to say, any particular method may be used to produce the desired compounds of the kind indicated. In some instances it may be desirable to conduct the esterification reaction in the presence of a nonvolatile inert solvent which simply acts as a diluent or viscosity reducer.

In the preceding examples, attention has been directed primarily to the monomeric form, or, at least, to the form in which the bifunctional alcohol, i. e., a glycol, and the polyfunctional acid, usually a bifunctional compound, react to give a chain type compound, in which the adjacent acid and glycol nucleus occur as a structural unit. For instance, in the monomeric form this may be indicated in the following manner:

acid ... glycol ... acid

If, however, one prepared an intermediate product employing the ratio of three moles of maleic anhydride and two moles of nonaethylene glycol, the tendency would be to produce a product which might be indicated in the following manner:

acid ... glycol ... acid ... glycol ... acid

Similarly, three moles of the glycol and four moles of the acid might tend to give a combination which may be indicated thus:

acid ... glycol ... acid ... glycol ...
                    acid ... glycol ... acid Another way of stating the matter is that the composition may be indicated in the following manner:

$TOOC.D.COO[(C_2H_4O)_{m-1}C_2H_4OOC.D.COO]_xT$ in which the characters have their previous significance and $x$ is a relatively small whole number less than 10 and probably less than 5; and in the monomeric form $x$, of course, is 1. The limitations on the size of $x$ are probably influenced, largely, by the fact that reaction leading to further growth is dependent upon random contact.

Some of the products are self-emulsifiable oils, or self-emulsifiable compounds, whereas, others give cloudy solutions or sols; and the most desirable type is characterized by giving a clear solution in water, and usually in the presence of soluble calcium or magnesium salts, and frequently, in the presence of significant amounts of either acids or alkalies.

Water solubility can be enhanced in a number of ways which have been suggested by previous manufacturing directions, for instance:

(a) By using a more highly polymerized ethylene glycol;

(b) By using a polymeric form instead of a monomeric form in regard to the unit which forms the chain between the two alcoholic nuclei;

(c) By using a polybasic carboxy acid of lower molecular weight, for instance, maleic acid instead of adipic acid; and (d) By using an alcoholic reactant of lower molecular weight, or one having more hydroxyl groups, or possibly, having one or more ether groups.

Indeed, in many instances, the hydroxylated body may show some tendency towards water solubility or self-emulsification prior to reaction with a glycol ester. It is to be noted in this instance that the hydroxylated materials which are employed prior to reaction with the glycol ester are largely of the water-soluble type, but in such instances where they are self-emulsifiable or show hydrophobe properties, they are equally suitable.

Actually, a reaction involving an alcohol and an acid (esterification) may permit small amounts of either one or both of the reactants, depending upon the predetermined proportion, to remain in an unreacted state. In the actual preparation of compositions of the kind herein contemplated, any residual acidity can be removed by any suitable base, for instance, ammonia, triethanolamine, or the like, especially in dilute solution. Naturally, precaution should be taken, so that neutralization takes place without saponification or decomposition of the ester. In some cases there is no objection to the presence of the acidic group. Indeed, if a tribasic acid be employed in such a manner as to leave one free carboxyl group, then it is usually desirable to neutralize such group by means of a suitable basic material.

In the hereto appended claims, reference to a neutral product refers to one in which free carboxylic radicals are absent.

Conventional demulsifying agents employed in the treatment of oil field emulsions are used as such, or after dilution with any suitable solvent, such as water; petroleum hydrocarbons, such as gasoline, kerosene, stove oil, a coal tar product, such as benzene, toluene, xylene, tar acid oil, cresol, anthracene oil, etc. Alcohols particularly aliphatic alcohols, such as methyl alcohol, ethyl alcohol, denatured alcohol, propyl alcohol, butyl alcohol, hexyl alchol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials herein described, may be admixed with one or more of the solvents customarily used in connection with conventional demulsifying agents, provided that such compounds are compatible. They will be compatible with the hydrophile type of solvent in all instances. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials herein described, except that they are invariably water-soluble.

We desire to point out that the superiority of the reagent or demulsifying agent contemplated in our herein described process for breaking petroleum emulsions, is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our improved proces for resolving petroleum emulsions of the water-in-oil type, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration processes.

The demulsifier herein contemplated may be employed in connection with what is commonly known as down-the-hole procedure, i. e., bringing the demulsifier in contact with the fluids of the well at the bottom of the well, or at some point prior to their emergence. This particular type of application is decidedly feasible when the demulsifier is used in connection with acidification of calcareous oil-bearing strata, especially if suspended in or dissolved in the acid employed for acidification.

It will be apparent to those skilled in the art that residual carboxyl acidity can be eliminated by esterification with a low molal alcohol, for instance, ethyl, methyl, or propyl alcohol, by conventional procedure so as to give a substantial neutral product. The introduction of such low molal hydrophobe groups does not seriously affect the solubility, and in some instances, gives increased resistance, to soluble calcium and magnesium salts, for such property is of particular value. Usually, however, neutralization with a dilute solution of ammonia or the like is just as practicable and less expensive.

In the hereto appended claims, it is intended that the monomeric forms contemplate also the polymeric forms, insofar that the polymeric forms are nothing more or less than a repetition of the monomeric forms several times over, with the loss of one or more moles of water.

Reference has previously been made to our co-pending application Serial No. 401,378, which is concerned with a water-soluble esterification product, derived by reaction between one mole of a polybasic compound and two moles of a basic hydroxylated acylated polyamino compound free from ether linkages; the polybasic compound being the esterification product of (A) a polyalkylene glycol having at least 7 and not more than 17 ether linkages, and the alkylene radical thereof containing at least 2 and not more than 6 carbon atoms; and (B) a polybasic carboxy acid having not more than 6 carbon atoms; and the ratio of the esterifying reactants being within the range of more than 1 and not over 2 moles of the polybasic acid for each mole of the glycol; and said basic hydroxylated acylated polyamino compound free from ether linkages being of the following formula:

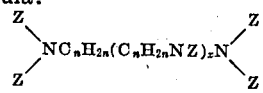

in which $n$ represents a small whole number varying from 2 to 10; $x$ is a small whole number varying from 0 to 10; Z is a member of the class consisting of H, RCO, R'CO, and D, in which RCO represents an acyl radical derived from a detergent-forming monocarboxy acid; R'CO is an acyl radical derived from a lower molecular weight carboxy acid having 6 carbon atoms or less; and D is a member of the class consisting of alkyl, hydroxyalkyl, aminoalkyl, and acyloxyalkylene, in which instance the acyl group is a member of the class consisting of RCO and R'CO; and the acylated polyamine is further characterized by the fact that there must be present a member of the class consisting of (a) acyloxyalkylene radical in which the acyl group is RCO; and (b) joint occurrence of an amido radical in which the acyl group is RCO and a hydroxyalkyl radical.

As has been stated in the present instance, one is concerned with the manufacture of a new composition of matter from various amines as raw materials. Among the various amines included are those which appear in the aforementioned U. S. Patent No. 2,243,329, to De Groote and Blair, dated May 27, 1941, that particular patent being concerned with a basic type acylated polyamine of the following formula:

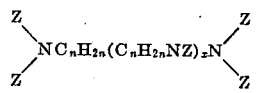

in which $n$ represents a small whole number varying from 2 to 10; $x$ is a small whole number varying from 1 to 10; Z is a member of the class consisting of H, RCO, R'CO, and D, in which RCO represents an acyl radical derived from a higher molecular weight carboxy acid; R'CO is an acyl radical derived from a lower molecular weight carboxy acid having 6 carbon atoms or less; and D is a member of the class consisting of alkyl, hydroxyalkyl, aminoalkyl, and acyloxyalkylene, in which instance the acyl group is a member of the class consisting of RCO and R'CO; and the acylated polyamine is further characterized by the fact that there must be present a member of the class consisting of (a) acyloxyalkylene radical in which the acyl group is RCO; and (b) joint occurrence of an amide radical in which the acyl group is RCO and a hydroxyalkyl radical.

The present invention is concerned with a water-soluble esterification product, derived by reaction between one mole of a polybasic compound and two moles of a basic hydroxylated acylated polyamino compound free from ether linkages; the polybasic compound being the esterification product of (A) a polyalkylene glycol having at least 7 and not more than 17 ether linkages, and the alkylene radical thereof containing at least 2 and not more than 6 carbon atoms; and (B) a polybasic carboxy acid having not more than 6 carbon atoms; and the ratio of the esterifying reactants being within the range of more than 1 and not over 2 moles of the polybasic acid for each mole of the glycol; and said basic hydroxylated acylated polyamino compound free from ether linkages being of the following formula:

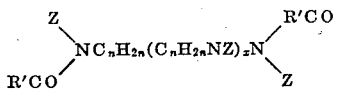

in which all characters have their previous significance, except that $x$, instead of varying from 0 to 10, varies from 1 to 10.

In the preferred type there is present at least one basic amino nitrogen atom.

Having thus described our invention, what we claim as new and desire to secure by Letters Patent is:

1. A process for breaking petroleum emulsions of the water-in-oil type, characterized by subjecting the emulsion to the action of a demulsifying agent comprising a water-soluble esterification product, derived by reaction between one mole of a polybasic compound and two moles of a basic hydroxylated polyacylated polyamino compound free from ether linkages; the polybasic compound being the esterification product of (A) a polyalkylene glycol having at least 7 and not more than 17 ether linkages, and the alkylene radical thereof containing at least 2 and not more than 6 carbon atoms; and (B) a polybasic carboxy acid having not more than 6 carbon atoms; and the ratio of the esterifying reactants being within the range of more than 1 and not over 2 moles of the polybasic acid for each mole of the glycol; and said basic hydroxylated polyacylated polyamino compound free from ether linkages being of the following formula type:

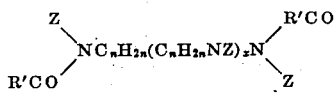

in which $n$ represents a small whole number varying from 2 to 10; $x$ is a small whole number varying from 1 to 10; Z is a member of the class consisting of H, RCO, R'CO, and D, in which RCO represents an acyl radical derived from a detergent-forming monocarboxy acid; R'CO is an acyl radical derived from a lower molecular weight carboxy acid having 5 carbon atoms or less; and D is a member of the class consisting of alkyl, hydroxyalkyl, aminoalkyl, and acyloxyalkylene, in which instance the acyl group is a member of the class consisting of RCO and R'CO; and the polyacylated polyamine is further characterized by the fact that there must be present a member of the class consisting of (a) acyloxyalkylene radical in which the acyl group is RCO; and (b) joint occurrence of an amido radical in which the acyl group is RCO and a hydroxyalkyl radical.

2. A process for breaking petroleum emulsions of the water-in-oil type, characterized by subjecting the emulsion to the action of a demulsifying agent comprising a neutral, water-soluble esterification product, derived by reaction between one mole of a polybasic compound and two moles of a basic hydroxylated polyacylated polyamino compound free from ether linkages; the polybasic compound being the esterification product of (A) a polyalkylene glycol having at least 7 and not more than 17 ether linkages, and the alkylene radical thereof containing at least 2 and not more than 6 carbon atoms; and (B) a polybasic carboxy acid having not more than 6 carbon atoms; and the ratio of the esterifying reactants being within the range of more than 1 and not over 2 moles of the polybasic acid for each mole of the glycol; and said basic hydroxylated polyacylated polyamino compound free from ether linkages being of the following formula type:

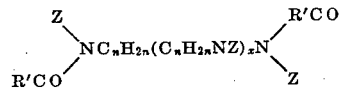

in which $n$ represents a small whole number vary from 2 to 10; $x$ is a small whole number varying from 1 to 10; Z is a member of the class consisting of H, RCO, R'CO, and D, in which RCO represents an acyl radical derived from a detergent-forming monocarboxy acid; R'CO is an acyl radical derived from a lower molecular weight carboxy acid having 5 carbon atoms or less; and D is a member of the class consisting of alkyl, hydroxylalkyl, aminoalkyl, and acyloxyalkylene, in which instance the acyl group is a member of the class consisting of RCO and R'CO; and the polyacylated polyamine is further characterized by the fact that there must be present a member of the class consisting of (a) acyloxyalkylene radical in which the acyl group is RCO; and (b) joint occurrence of an amido radical in which the acyl group is RCO and a hydroxyalkyl radical.

3. A process for breaking petroleum emulsions of the water-in-oil type, characterized by subjecting the emulsion to the action of a demulsifying agent comprising a neutral, water-soluble esterification product, derived by reaction between one mole of a dibasic acid and two moles of a basic hydroxylated polyacylated polyamino compound free from ether linkages; the dibasic compound being the esterification product of (A) a polyalkylene glycol having at least 7 and not more than 17 ether linkages, and the alkylene radical thereof containing at least 2 and not more than 6 carbon atoms; and (B) a dibasic carboxy acid having not more than 6 carbon atoms; and the ratio of the esterifying reactants being within the range of more than 1 and not over 2 moles of the dibasic acid for each mole of the glycol; and said basic hydroxylated polyacylated polyamino compound free from ether linkages being of the following formula type:

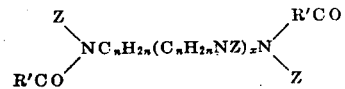

in which $n$ represents a small whole number varying from 2 to 10; $x$ is a small whole number varying from 1 to 10; Z is a member of the class consisting of H, RCO, R'CO, and D, in which RCO represents an acyl radical derived from a detergent-forming monocarboxy acid; R'CO is an acyl radical derived from a lower molecular weight carboxy acid having 5 carbon atoms or less; and D is a member of the class consisting of alkyl, hydroxyalkyl, aminoalkyl, and acyloxyalkylene, in which instance the acyl group is a member of the class consisting of RCO and R'CO; and the polyacylated polyamine is further characterized by the fact that there must be present a member of the class consisting of (a) acyloxyalkylene radical in which the acyl group is RCO; and (b) joint occurrence of an amido radical in which the acyl group is RCO and a hydroxyalkyl radical.

4. A process for breaking petroleum emulsions of the water-in-oil type, characterized by subjecting the emulsion to the action of a demulsifying agent comprising a neutral, water-soluble esterification product, derived by reaction between one mole of a dibasic acid and two moles of a basic hydroxylated polyacylated polyamino compound free from ether linkages; the dibasic compound being the esterification product of (A) a polyalkylene glycol having at least 7 and not more than 17 ether linkages, and the alkylene radical thereof containing at least 2 and not more than 4 carbon atoms; and (B) a dibasic carboxy acid having not more than 6 carbon atoms; and the ratio of the esterifying reactants being within the range of more than 1 and not over 2 moles of the dibasic acid for each mole of the glycol, and said basic hydroxylated polyacylated polyamino compound free from ether linkages being of the following type:

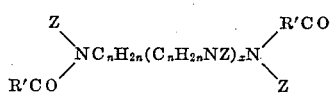

in which n represents a small whole number varying from 2 to 10; x is a small whole number varying from 1 to 10; Z is a member of the class consisting of H, RCO, R'CO, and D, in which RCO represents an acyl radical derived from a detergent-forming monocarboxy acid; R'CO is an acyl radical derived from a lower molecular weight carboxy acid having 5 carbon atoms or less; and D is a member of the class consisting of alkyl, hydroxyalkyl, aminoalkyl, and acyloxyalkylene, in which instance the acyl group is a member of the class consisting of RCO and R'CO; and the polyacylated polyamine is further characterized by the fact that there must be present a member of the class consisting of (a) acyloxyalkylene radical in which the acyl group is RCO; and (b) joint occurrence of an amido radical in which the acyl group is RCO and a hydroxyalkyl radical.

5. A process for breaking petroleum emulsions of the water-in-oil type, characterized by subjecting the emulsion to the action of a demulsifying agent comprising a neutral, water-soluble esterification product, derived by reaction between one mole of a dibasic acid and two moles of a basic hydroxylated polyacylated polyamino compound free from ether linkages; the dibasic compound being the esterification product of (A) a polyethylene glycol having at least 7 and not more than 17 ether linkages; and (B) a dibasic carboxy acid having not more than 6 carbon atoms; and the ratio of the esterifying reactants being within the range of more than 1 and not over 2 moles of the dibasic acid for each mole of the glycol; and said basic hydroxylated polyacylated polyamino compound free from ether linkages being of the following formula type:

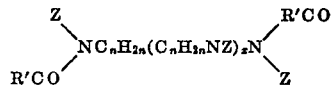

in which n represents a small whole number varying from 2 to 10; x is a small number varying from 1 to 10; Z is a member of the class consisting of H, RCO, R'CO, and D, in which RCO represents an acyl radical derived from a detergent-forming monocarboxy acid; R'CO is an acyl radical derived from a lower molecular weight carboxy acid having 5 carbon atoms or less; and D is a member of the class consisting of alkyl, hydroxyalkyl, aminoalkyl, and acyloxyalkylene, in which instance the acyl group is a member of the class consisting of RCO and R'CO; and the polyacylated polyamine is further characterized by the fact that there must be present a member of the class consisting of (a) acyloxylakylene radical in which the acyl group is RCO; and (b) joint occurrence of an amido radical in which the acyl group is RCO and a hydroxyalkyl radical.

6. A process for breaking petroleum emulsions of the water-in-oil type, characterized by subjecting the emulsion to the action of a demulsifying agent comprising a neutral, water-soluble chemical compound of the following formula type:

TOOC.D.COO[(C₂H₄O)ₘC₂H₄OOC.D.COO]ₓT in which T is a radical derived by the dehydroxylation of a dibasic hydroxylated polyacylated polyamino compound free from ether linkages of the following type:

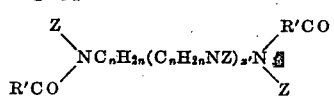

in which n represents a small whole number varying from 2 to 10; x' is a small whole number varying from 1 to 10; Z is a member of the class consisting of H, RCO, R'CO, and D', in which RCO represents an acyl radical derived from a detergent-forming monocarboxy acid; R'CO is an acyl radical derived from a lower molecular weight carboxy acid having 5 carbon atoms or less; and D' is a member of the class consisting of alkyl, hydroxyalkyl, aminoalkyl, and acyloxyalkylene, in which instance the acyl group is a member of the class consisting of RCO and R'CO; and the polyacylated polyamine is further characterized by the fact that there must be present a member of the class consisting of (a) acyloxyalkylene radical in which the acyl group is RCO; and (b) joint occurrence of an amido radical in which the acyl group is RCO and a hydroxyalkyl radical; OOC.D.COO is the acid radical derived from a dibasic acid by removal of the acidic hydrogen atoms; said acid radical having not over 6 carbon atoms; m represents a numeral varying from 7 to 12; and x is a small whole number less than 10.

7. A process for breaking petroleum emulsions of the water-in-oil type, characterized by subjecting the emulsion to the action of a demulsifying agent comprising a neutral, water-soluble chemical compound of the following formula type:

TOOC.D.COO(C₂H₄O)ₘC₂H₄OOC.D.COO.T in which T is a radical derived by the dehydroxylation of a dibasic hydroxylated polyacylated polyamino compound free from ether linkages of the following type:

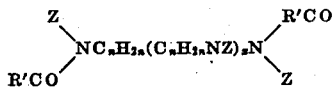

in which $n$ represents a small whole number varying from 2 to 10; $x$ is a small whole number varying from 1 to 10; Z is a member of the class consisting of H, RCO, R'CO, and D', in which RCO represents an acyl radical derived from a detergent-forming monocarboxy acid; R'CO is an acyl radical derived from a lower molecular weight carboxy acid having 5 carbon atoms or less; and D' is a member of the class consisting of alkyl, hydroxyalkyl, aminoalkyl, and acyloxyalkylene, in which instance the acyl group is a member of the class consisting of RCO and R'CO; and the polyacylated polyamine is further characterized by the fact that there must be present a member of the class consisting of (a) acyloxyalkylene radical in which the acyl group is RCO; and (b) joint occurrence of an amido radical in which the acyl group is RCO and a hydroxyalkyl radical; OOC.D.COO is the acid radical derived from a dibasic acid by removal of the acidic hydrogen atoms; said acid radical having not over 6 carbon atoms; and $m$ represents a numeral varying from 7 to 12.

8. A process for breaking petroleum emulsions of the water-in-oil type, characterized by subjecting the emulsion to the action of a demulsifying agent comprising a neutral, water-soluble chemical compound of the following formula type:

in which T is a radical derived by the dehydroxylation of a dibasic hydroxylated polyacylated polyamino compound free from ether linkages of the following type:

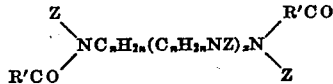

in which $n$ represents a small whole number varying from 2 to 10; $x$ is a small whole number varying from 1 to 10; Z is a member of the class consisting of H, RCO, R'CO, and D', in which RCO represents an acyl radical derived from a detergent-forming monocarboxy acid; R'CO is an acyl radical derived from a lower molecular weight carboxy acid having 5 carbon atoms or less; and D' is a member of the class consisting of alkyl, hydroxyalkyl, aminoalkyl, and acyloxyalkylene, in which instance the acyl group is a member of the class consisting of RCO and R'CO; and the polyacylated polyamine is further characterized by the fact that there must be present a member of the class consisting of (a) acyloxyalkylene radical in which the acyl group is RCO; and (b) joint occurrence of an amido radical in which the acyl group is RCO and a hydroxyalkyl radical; OOC.D.COO is the acid radical derived from maleic acid by removal of the acidic hydrogen atoms; and $m$ represents a numeral varying from 7 to 12.

9. A process for breaking petroleum emulsions of the water-in-oil type, characterized by subjecting the emulsion to the action of a demulsifying agent comprising a neutral, water-soluble chemical compound of the following formula type:

in which T is a radical derived by the dehydroxylation of a dibasic hydroxylated polyacylated polyamino compound free from ether linkages of the following type:

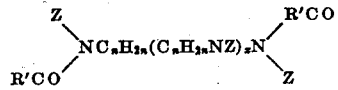

in which $n$ represents a small whole number varying from 2 to 10; $x$ is a small whole number varying from 1 to 10; Z is a member of the class consisting of H, RCO, R'CO, and D', in which RCO represents an acyl radical derived from a detergent-forming monocarboxy acid; R'CO is an acyl radical derived from a lower molecular weight carboxy acid having 5 carbon atoms or less; and D' is a member of the class consisting of alkyl, hydroxyalkyl, aminoalkyl, and acyloxyalkylene, in which instance the acyl group is a member of the class consisting of RCO and R'CO and the polyacylated polyamine is further characterized by the fact that there must be present a member of the class consisting of (a) acyloxyalkylene radical in which the acyl group is RCO; and (b) joint occurrence of an amido radical in which the acyl group is RCO and a hydroxyalkyl radical; OOC.D.COO is the acid radical derived from succinic acid by removal of the acidic hydrogen atoms; and $m$ represents a numeral varying from 7 to 12.

10. A process for breaking petroleum emulsions of the water-in-oil type, characterized by subjecting the emulsion to the action of a demulsifying agent comprising a neutral, water-soluble chemical compound of the following formula type:

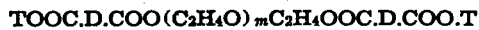

in which T is a radical derived by the dehydroxylation of a dibasic hydroxylated polyacylated polyamino compound free from ether linkages of the following type:

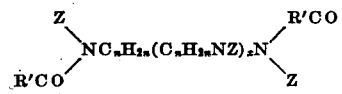

in which $n$ represents a small whole number varying from 2 to 10; $x$ is a small whole number varying from 1 to 10; Z is a member of the class consisting of H, RCO, R'CO, and D', in which RCO represents an acyl radical derived from a detergent-forming monocarboxy acid; R'CO is an acyl radical derived from a lower molecular weight carboxy acid having 5 carbon atoms or less; and D' is a member of the class consisting of alkyl, hydroxyalkyl, aminoalkyl, and acyloxyalkylene, in which instance the acyl group is a member of the class consisting of RCO and R'CO; and the polyacylated polyamine is further characterized by the fact that there must be present a member of the class consisting of (a) acyloxyalkylene radical in which the acyl group is RCO; and (b) joint occurrence of an amido radical in which the acyl group is RCO and a hydroxyalkyl radical; OOC.D.COO is the acid radical derived from adipic acid by removal of the acidic hydrogen atoms; and $m$ represents a numeral varying from 7 to 12.

MELVIN DE GROOTE.
BERNHARD KEISER.